United States Patent

[11] 3,603,776

[72] Inventor Arnold Weinberger
Newburgh, N.Y.
[21] Appl. No. 791,344
[22] Filed Jan. 15, 1969
[45] Patented Sept. 7, 1971
[73] Assignee International Business Machines Corporation
Armonk, N.Y.

[54] BINARY BATCH ADDER UTILIZING THRESHOLD COUNTERS

5 Claims, 9 Drawing Figs.

[52] U.S. Cl. .......... 235/175, 235/155
[51] Int. Cl. .......... G06f 5/02, G06f 7/50
[50] Field of Search .......... 235/175, 173, 164, 154, 155; 340/347 DD

[56] References Cited

UNITED STATES PATENTS

| | | | |
|---|---|---|---|
| 2,941,720 | 6/1960 | Marshall, Jr. et al. | 235/164 |
| 3,141,964 | 7/1964 | Fleisher et al. | 235/164 |
| 3,202,806 | 8/1965 | Menne | 235/175 |
| 3,299,261 | 1/1967 | Steigerwalt, Jr. | 235/175 |
| 3,393,304 | 7/1968 | Dell et al. | 235/175 X |
| 3,466,433 | 9/1969 | Duda et al. | 235/175 |

*Primary Examiner*—Malcolm A. Morrison
*Assistant Examiner*—David H. Malzahn
*Attorney*—Hanifin and Jancin

ABSTRACT: Disclosed are counters for counting inputs in terms of a fewer number of outputs. The counters are useful in batch adders for simultaneously adding a plurality of multibit numbers. The counters include first and second binary threshold function generators which each receive a different group of inputs. The generators are in parallel with respect to the inputs and each generates a plurality of binary threshold functions. The binary threshold functions are selectively combined in first, second and third threshold combining circuits to form the counter outputs. The combining circuits are placed in parallel and each circuit logically combines one or more threshold function inputs derived from the function generators.

INVENTOR
ARNOLD WEINBERGER

BY David E. Lovejoy

ATTORNEY

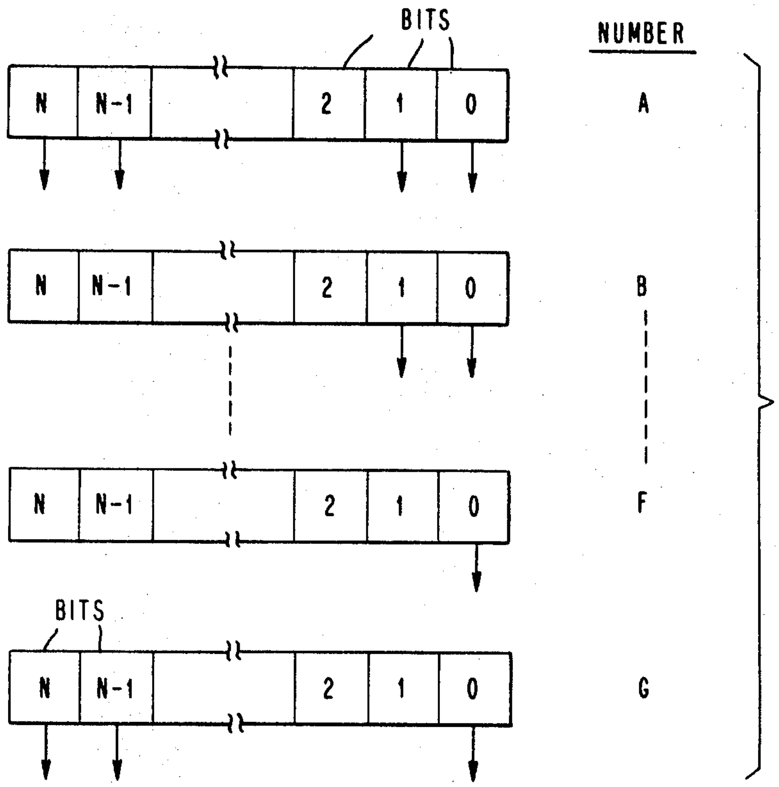

FIG. 3

| LOGIC ELEMENT | FAN-IN | SYMBOL & FUNCTION | FAN-OUT NO. | FAN-OUT TYPE |
|---|---|---|---|---|
| (NOR) CURRENT SWITCH (OR) | 4 | A, B; 20 Ā B̄ (OUT-OF-PHASE) SIGNAL; 21 A+B (IN-PHASE) SIGNAL; 22 | 10<br>10 | CURRENT SWITCHES (DIRECTLY OR VIA EMITTER-DOTS)<br>CURRENT SWITCHES (DIRECTLY VIA COLLECTOR DOTS OR VIA EMITTER DOTS) |
| COLLECTOR-DOT (AND) | 4 | A+B, E+F; 23 (A+B)·(E+F) | 10 | CURRENT SWITCHES (DIRECTLY OR VIA EMITTER-DOTS) |
| EMITTER-DOT (OR) | 8 WITH MAXIMUM OF 4 "ON" | [(A+B)·(E+F)], Ā B̄; [(A+B)·(E+F)] + Ā B̄; 24 | 10 | CURRENT SWITCHES (DIRECTLY) |

FIG. 4

BINARY BATCH ADDER UTILIZING THRESHOLD COUNTERS

BACKGROUND OF THE INVENTION

The invention relates to counters which are frequently used in data processing systems for carrying out batch addition. The counters are also frequently called encoders or eliminating circuits because they operate to count inputs of one or more different weights in terms of outputs of one or more different weights. The number of outputs is less than the number of inputs so that the counters function to reduce the number of signal lines in the output as compared with the number of signal lines in the input.

Although counters have been identified in the prior art as encoders a distinction between counters and encoders should be made. Encoders are generally considered the reverse of decoders. In general, a decoder takes an N-bit number as an input and energizes in response thereto one (and only one) of its $2^N$ outputs. The reverse of a decoder, therefore, senses the energization of one (and only one) of a possible $2^N$ inputs and forms an N-bit number identifying that one input. By way of comparison and distinction, a counter detects the number of energized inputs, one or more, out of the total $2^N-1$ inputs and forms an N-bit number identifying the number of energized inputs. For example, eight inputs ($2^3$) can be exactly encoded into three bits. In order to count three inputs, however, four bits are required. Three bits in a counter can count a maximum of seven equally weighted inputs. Therefore, three bits when used as an encoder can detect and identify which one (and only one) of eight input signal lines is energized and three bits in a counter can detect how many of seven input signals are energized.

One prior art batch addition technique is described in U.S. Pat. No. 3,141,964 entitled "Calculating Memory," issued July 21, 1964, and assigned to the assignee of the present invention. In that patent, multibit binary numbers are stored in memory words, one number per word. Using the apparatus described therein, a plurality of words (that is, multibit numbers) are simultaneously added together. Counters consisting of counting and decode networks that use cryogenic technology are employed in the addition and they yield 7–to–3 reductions. That is, for seven equally weighted inputs, three unequally weights (1,2,4) outputs are formed. Those cryogenic circuits are not economically convertible to solid-state devices such as are found in monolithic technology since they use techniques which employ high numbers of circuit levels. The use of many circuits levels, of course, is undesirable because of the time delay introduced into the counter as a result of the signals propagating through many circuit levels. Each circuit level adds unwanted delay.

In U.S. Pat. No. 3,346,729 entitled, "Digital Multiplier Employing Matrix of NOR Circuits," issued Oct. 10, 1967, the use of analog threshold circuits for implementing 5–to–3, 4–to–3 etc., counters is shown. Since the counters in the patent require the analog summing of input signals, the counters must be more critically adjusted than conventional binary logic circuits and therefore are not as desirable for high reliability operation. Additionally, the analog threshold operation employs feedback paths for inhibiting, at selected times, the operation of selected outputs. The feedback paths necessarily slow down the counter operation.

Other prior art devices have also employed counters suitable for use in batch adders. For example, U.S. Pat. No. 2,941,720, entitled, "Binary Multiplier," issued June 21, 1960, depicts in FIG. 6*c*, a 7–to–3 counter which is constructed of two circuit levels of conventional 3–to–2 counters. Each 3–to–2 counter is constructed employing electronic tubes although each can readily be constructed using transistors or other electronic elements. U.S. Pat. No. 3,299,261 entitled, "Multiple Input Memory Accessing Apparatus," issued June 17, 1967, depicts a batch adder constructed using 3–to–2 counters. In the 2,941,720 Patent, two levels of 3–to–2 counters are employed to implement a 7–to–3 counter. This implementation, however, has the detriment that the three 3–to–2 counters of the first level propagate the carry through each of the two higher order 3–to–2 counters since they have a carry input from the next lower 3–to–2 counters. This conventional interconnection of carry inputs from stage to stage in the same circuit level is detrimental in that the carry may be rippled through every higher order stage thus slowing down the operation of the counter.

The use of additional levels of counters, as distinguished from rippling carries from one counter to the next within the same level, is known in the prior art. In order to implement a 7–to–3 counter using groups of 3–to–2 counters without propagating a ripple through all counters on the same level, the 3,299,261 Patent employs five levels of 3–to–2 counters as is apparent from FIG. 3*c* therein. While that patent suggests five levels of 3–to–2 counters to avoid ripple, rippleless circuits employing as few as three levels of 3–to–2 counters have also been designed. While three levels are more desirable than five, an even greater reduction is desirable provided an "efficient" circuit design can be employed to achieve that reduction. With modern solid-state technologies, the measure of "efficiency" in circuit design is changing and is therefore briefly reviewed.

As modern design techniques of solid-state circuits place larger and larger numbers of circuits onto small silicon or other semiconductor wafers, the cost of individual transistors or other components becomes of reduced importance although it still is important. A paramount parameter of interest is the number of serial circuit levels a signal must traverse since the greater the number of circuit levels the greater the delay. Another parameter of interest to counters is the reduction capability of the circuitry which can be located on a single semiconductor wafer (frequently called a "chip") since the higher the reduction ratio of a counter the fewer the number of chip-to-chip interconnections that are likely to be required. A reduction in the number of chip-to-chip interconnections is desirable, of course, because those interconnections are a limiting factor in circuitry smallness (that is, density) as well as being less reliable when compared to connections purely internal to a single chip.

A measure of the reduction ratio of a counter can be obtained by raising the counter inputs divided by the counter outputs to the power of counter levels. For example, if a 3–to–2 counter requires one circuit level for implementation, then two circuit levels (also two 3–to–2 counter levels) will have a reduction ratio of $(3/2)^2=9/4=2.25$.

Another parameter of interest is the fan-in and fan-out capability of the basic building blocks of which the various logic levels are constructed. An efficient counter, of course, must not violate the practical fan-in and fan-out limitations. In addition to all of the above parameters, a design must be employed which does not cause the carry to ripple throughout the stages within the same circuit level since such a ripple defeats the objective of reducing delay.

In view of the drawbacks which appear in prior art devices as summarized above, an objective of the present invention is to provide a counter suitable for use in batch adders which employs a minimum of circuit levels so as to minimize delay, which exhibits a high reduction ratio so as to minimize the number of external (chip-to-chip) connections, which does not generate delay by causing carry ripples to be propagated through the same logic levels, and which can be implemented using circuits which have reasonable fan-in and fan-out requirements.

SUMMARY OF THE INVENTION

The present invention is a counter apparatus for counting inputs in terms of a fewer number of outputs. Such counters are particularly useful in batch adders which simultaneously add a plurality of multibit numbers.

The counters of the present invention include a first and a second binary threshold function generator. In one embodiment, a first group of equally weighted inputs is connected to the first function generator and a second group of equally weighted inputs is connected to the second function generator. The first and second function generators are in parallel with respect to the inputs and each generates a plurality of binary threshold functions using only one level of logic circuitry. The binary threshold functions from the generators are selectively combined in first, second and third threshold combining circuits. The combining circuits, like the function generators, are placed in parallel and include only one level of logic circuitry. Each combining circuit has one or more threshold function inputs derived from each of the function generators. In general, the number of threshold functions generated exceeds the number of equally weighted inputs to the function generator.

In order to generate the binary threshold functions, each function generator includes a plurality of current switching devices which logically combine groups of binary inputs to form the binary threshold outputs. The logical combinations are generated without exceeding the fan-in or fan-out capabilities of the current switches. The binary threshold functions of the present invention should be distinguished from prior art analog threshold functions. In the analog devices, analog summing networks such as resistors are employed to combine (analog add) inputs in order to obtain weighted binary outputs. In the present invention, no critical analog summing is required.

The binary threshold functions generated by the generators of the present invention are not just any binary threshold functions of the inputs but are "efficient" binary functions. The efficiency is derived in part, in accordance with the present invention, by dividing the inputs into two groups and forming two groups of threshold functions, respectively, as logical combinations of those inputs. The counter outputs are then formed by logically combining combinations of threshold functions selecting, in general for each output, functions from both groups.

While the present invention may be implemented for 6–to–3 5–to–3, and other counters, it is particularly useful for 7–to–3 counters since seven inputs of equal weight are the maximum number that can be counted with a 3-bit number. A 7–to–3 counter in accordance with the present invention permits a faster reduction of inputs than a combination of 3–to–2 counters grouped to obtain a 7–to–3 reduction. As previously indicated, the reduction ratio of two levels of 3–to–2 counters, each level of which is implemented with a minimum of one circuit level, is 9/4=2.25. The 7–to–3 counters of the present invention are implemented in two levels of circuitry which form one level of 7–to–3 counters. The reduction ratio for the 7–to–3 counter, therefore, is $(7/3)^1=2.33$. Since the reduction ratio is greater for the 7–to–3 counter, it is a preferable counter to employ in modern semiconductor technologies when large numbers of counters, such as in batch adders, are involved. It is preferable, of course, because the greater the reduction ratio the greater the likelihood of reducing external chip connections.

Another advantage of the counters of the present invention is that they permit the use of single-polarity signals while still using the same number of circuit levels as is required for double polarity signals. The use of single polarity signals, of course, advantageously reduces the number of inputs thereby desirably reducing the number of external connections to a chip. In contrast, known methods employing combinations of 3–to–2 counters require a greater number of circuit levels for singe polarity operation than is required for double polarity operation.

The 7–to–3 counters of the present invention are especially advantageous in cases where the number of equal inputs to be counted is closer to a power of 7 than to a power of 3. As previously indicated, three levels of 3–to–2 counters are needed to reduce seven binary numbers to three numbers as contrasted with one level of the 7–to–3 counters.

It is apparent from the above summary of the invention that an apparatus is provided which efficiently counts inputs in terms of a fewer number of outputs while avoiding a number of drawbacks attendant the prior art.

The foregoing and other objects, features and advantages of the invention will be apparent from the following more particular description of preferred embodiments of the invention, as illustrated in the accompanying drawings.

DESCRIPTION OF THE DRAWINGS

FIG. 3 depicts seven N-bit numbers A, B,..., G which form the inputs for the adder of FIG. 2.

FIG. 4 is a legend depicting representative logical functions and the symbols therefore which are used in the remainder of the drawings.

DETAILED DESCRIPTION

Figure 1:
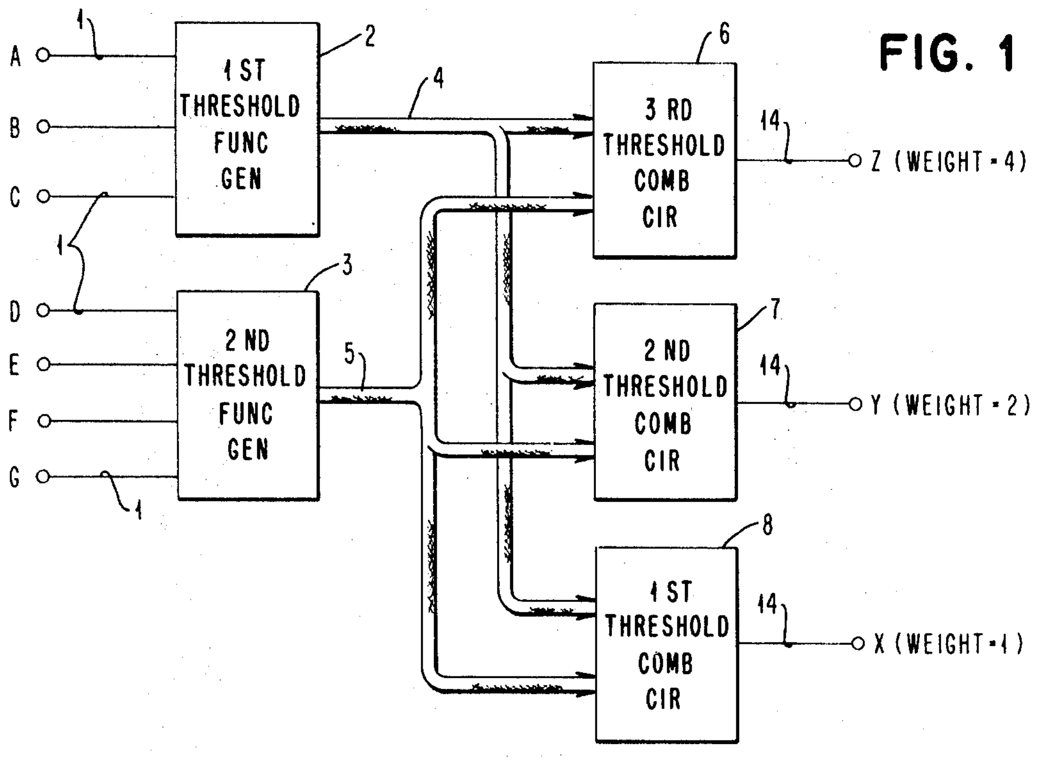
FIG. 1 depicts, in block diagram form, a 7–to–3 counter in accordance with the present invention.

A plurality of equally weighted inputs 1, labeled ABCDEFG, are counted by the FIG. 1 circuitry into three unequally weighted outputs 14 labeled X,Y,Z. The output X is designated as having a weight 1, the output Y as having a weight 2, and Z as having a weight 4. The inputs 1 are capable of having either a binary 1 or 0 condition and the outputs 14 are similarly capable of having a 1 or 0 condition. If three of the inputs out of the seven inputs are in a binary 1 condition and all the others are in a binary 0, then both the X and Y outputs will be 1 while the Z output will be 0. If five of the seven inputs are in a 1 condition, then the X and Z outputs are 1 and the Y output is 0. With the operation in the manner indicated, it is evident that FIG. 1 operates to count the number of inputs 1 in the binary 1 condition in terms of the outputs X, Y and Z.

The FIG. 1 apparatus is comprised of binary threshold function generators 2 and 3 each of which receive a group of the inputs 1. The function generators 2 and 3 generate a plurality of binary threshold functions on outputs 4 and 5, respectively. The threshold functions on outputs 4 and 5 consist of binary signals which are formed by only one level of logic circuitry, that is, the level formed by only one level of logic circuitry, that is, the level formed by generators 2 and 3. The first threshold function generator 2 generates a plurality of binary threshold function signals at output 4 by forming logical combinations of the first group of inputs A,B,C. The second threshold function generator 3 similarly generates a plurality of binary threshold signals at output 5 by forming logical combinations of the second group of inputs D,E,F, and G.

After forming the two groups of threshold functions in one level of logic circuitry, those two groups of signals are combined in three threshold combining circuits 6, 7 and 8. Each threshold combining circuit has an input from the first and the second threshold function generator. The combining circuits logically combine the binary threshold function signals using only one level of logic circuitry to form the weighted outputs X, Y, and Z.

Figure 2:
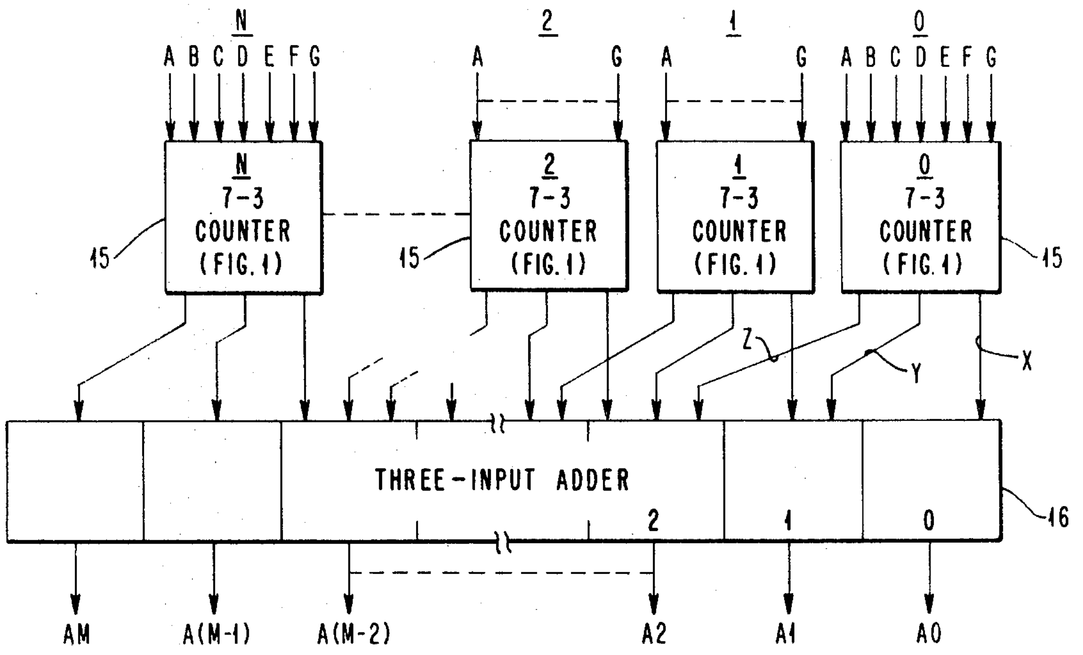
FIG. 2 depicts a block adder which employs a plurality of the 7–to–3 counters of FIG. 1.

FIG. 2 depicts 7–to–3 counters 15, like the counter of FIG. 1, employed to add seven N-bit numbers in conjunction with a 3-input adder 16. The N-bit numbers are depicted in further detail in FIG. 3. Each number is given a different letter A,B,...,G. Each number has 0, 1, 2,..., N-bit positions. The seven numbers of FIG. 3 may exist in any suitable location of a data processing system such as within a register, within memory, or dynamically on a bus. Means are provided connecting the like bits of each number of FIG. 3 to a different one of the 7–to–3 counters 15 of FIG. 2. For example, each of the 0 bits from each of the FIG. 3 numbers is connected to its respective input A,B,...,G of the $\underline{0}$ 7–3 COUNTER 15 of FIG. 2. Similarly, all of the 1 bits of the numbers in FIG. 3 are connected to the $\underline{1}$ 7–3 COUNTER 15 of FIG. 2. Since the inputs to each of the 7–to–3 counters 15 of FIG. 2 are derived from a like bit position in the numbers of FIG. 3, all of the inputs to any one of the counters 15 are of equal weight. The outputs from each of the counters 15 in FIG. 2 are of unequal weight and may be grouped according to their weights as inputs to the three input adder 16. More particularly, the 1 weight X output from the $\underline{0}$ stage of the 7–to–3 counter 15 is connected to the 0 stage of the three input adder 16. The Y output, however, is connected to the next higher stage, that is, the 1 stage of adder 16. Similarly, the Z output from the $\underline{0}$ 7–to–3 counter 15 is connnected to the 2 stage of adder 16. In a similar manner, the outputs from each of the counters 15 are connected with the lowest weight output to the same stage in adder 16, the next highest level output Y to the next highest level adder stage and finally the highest level output Z to he still next highest level stage of adder 16.

The three input adder 16 of FIG. 2 in a preferred embodiment is like that described in the *IBM Technical Disclosure Bulletin*, Vol. 10, No. 11, Apr. 1968, Pages 1717–1719, in an article entitled, "Fast Three-Input Adders" by A. Weinberger. Of course, any three-input adder or equivalent combination of counters may be employed as the adder 16.

In FIG. 4, the symbology for a typical current switch logical building block 22 is described which, when it has inputs A and B, generates the logical NOR output on line 20 of $\bar{A}\,\bar{B}$ as the out-of-phase signal and the logical OR output on line 21 of A+B as the in-phase signal (the notations being Boolean). As indicated in FIG. 4, additional logic can be gained by collector-dotting current switches 22 to form the logical AND. For example, two current switches having outputs (A+B) and (E+F), respectively, are collector-dotted to form (A+B)·(E+F) as symbolized by the triangle at line 23. Similarly, the logical OR can be achieved by emitter-dotting current switches 22 as symbolized by the circle at line 24. For example, the emitter-dotting of current switches having the signals as shown on lines 20 and 23 yields [(A+B)·(E+F)]+$\bar{A}\,\bar{B}$. While each of the symbols in FIG. 4 has shown only two inputs, more than two inputs may be used. For example, a current switch with inputs A,B,C and D would have a NOR output on line 20 $\bar{A}\,\bar{B}\,\bar{C}\,\bar{D}$ and a similar change for each of the other outputs.

Figure 5:
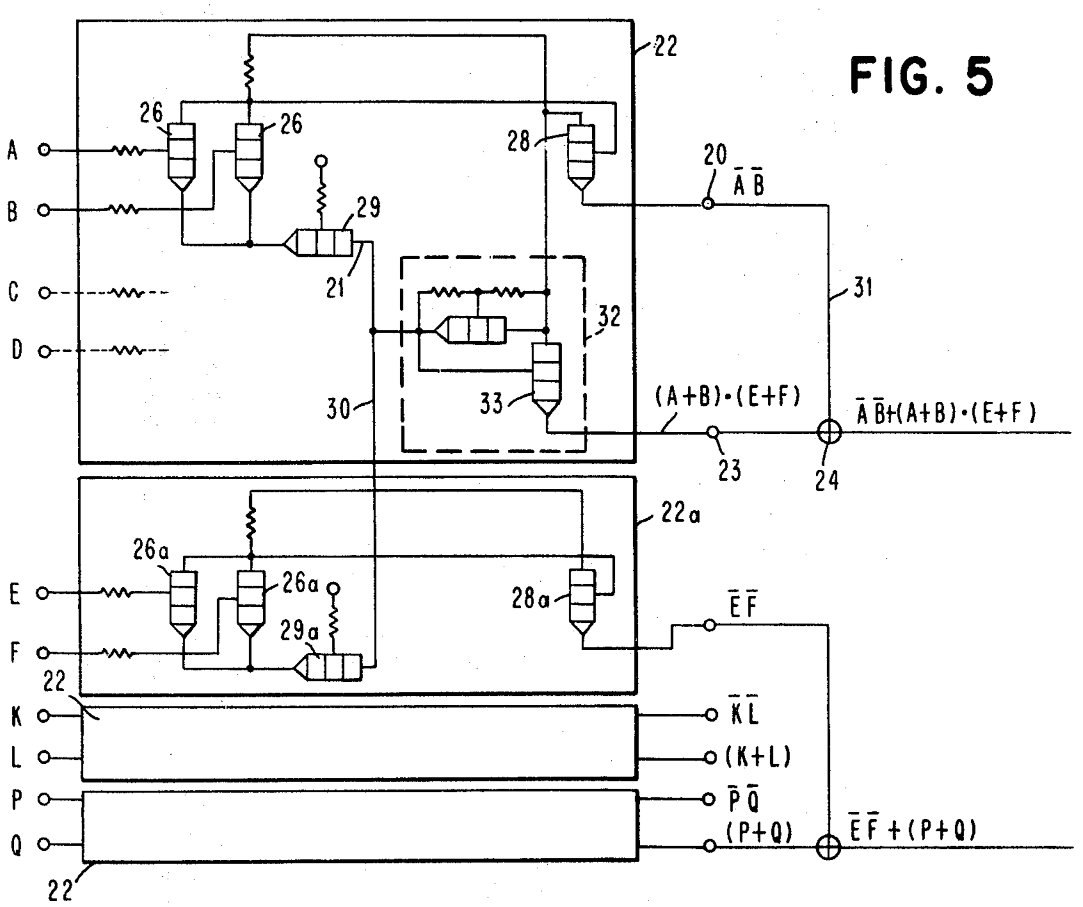
FIG. 5 depicts a current switch and its use as a building block to carry out the functions indicated in FIG. 4.

In FIG. 5, the current switch building blocks 22 which carry out the indicated functions of FIG. 4 may be of many forms known in the prior art. One preferred embodiment employs the current switching transistors 26, one for each of the inputs A,B,...,E,F, etc. The transistors 26 are connected through their collectors to an emitter-follower transistor 28 to yield, at output terminal 20, the NOR output $\bar{A}\,\bar{B}$. The in-phase output is formed through transistor 29 providing at terminal 21 the signal A+B. The A+B output at 21 appears at terminal 23 when the line 30 is absent and no collector-dotting is desired, as will be hereinafter described. One or two additional transistors (not shown) having inputs C and D can be provided in parallel with the transistors 26. When those two transistors are placed in parallel, the outputs at terminals 20 and 21 become $\bar{A}\,\bar{B}\,\bar{C}\,\bar{D}$ and A+B+C+D, respectively.

Another current switch 22*a* having inputs E and F is essentially identical to the current switch 22 and has current switching transistors 26*a*, emitter-follower transistor 28*a* and in-phase output transistor 29*a* forming outputs $\bar{E}\,\bar{F}$ and E+F, respectively. By collector dotting the in-phase output transistors 29 and 29*a* via the line 30, the AND (A+B)·(E+F) is performed and appears at output terminal 23. The output at terminal 23 is through the clamp circuit 32 which functions to prevent saturation of the transistors 29 and 29*a*. Only one clamp 32 need be provided for up to four current switches 22 although an output transistor 33 is required for each OR (e.g. A+B) if no dotting occurs.

By connecting the output terminals 20 and 23 by line 31 the emitter-dotting of the emitter-follower transistor 28 with the emitter of the transistor 33 is achieved so as to form the logical OR of the signals at 20 and 23 as given by $\bar{A}\,\bar{B}$+(A+B)·(E+F).

Additional current switches 22 having inputs K,L,...and P,Q,...may be provided with an essentially identical configuration as the current switches having inputs A,B and E,F. The collectors and emitters with the circuits 22 of FIG. 5 may be dotted or not to provide various logical functions as outlined in the chart of FIG. 4. If the connection 31 is not made and, alternatively, the connections are made to the lines $\bar{P}\,\bar{Q}$, (K+L) and terminal 23 then the OR output $\bar{P}\,\bar{Q}$+(K+L)+(A+B)·(E+F) is formed.

The number of collector dots, emitter-dots, and parallel current switching transistors 26 for proper operation the FIG. 5 circuitry is limited. The limitations are summarized in the legend of FIG. 4. For any current switch 22, the maximum number of parallel current switching transistors 26 is four. Therefore the current switch as a logical element has a fan-in limitation of four. The number of current switches 22 which can be collector-dotted (as connected by line 30) is four. The collector dot fan-in limitation, therefore, is four. The emitter-dotting (as connected by line 31) can include up to eight outputs provided that a maximum of four of those outputs are energized, that is in the binary 1 at any one time. The emitter-dot fan-in, therefore, is eight, but limited to a maximum of four "on." In a similar manner, the fan-out limitations of the FIG. 5 circuitry are identified in the FIG. 4 legend. For example, the NOR output 20 from a current switch 22 can be connected as input to as many as 10 different current switches, either directly or through emitter-dots. Similar limitations are identified for the other fan-outs.

Figure 6:
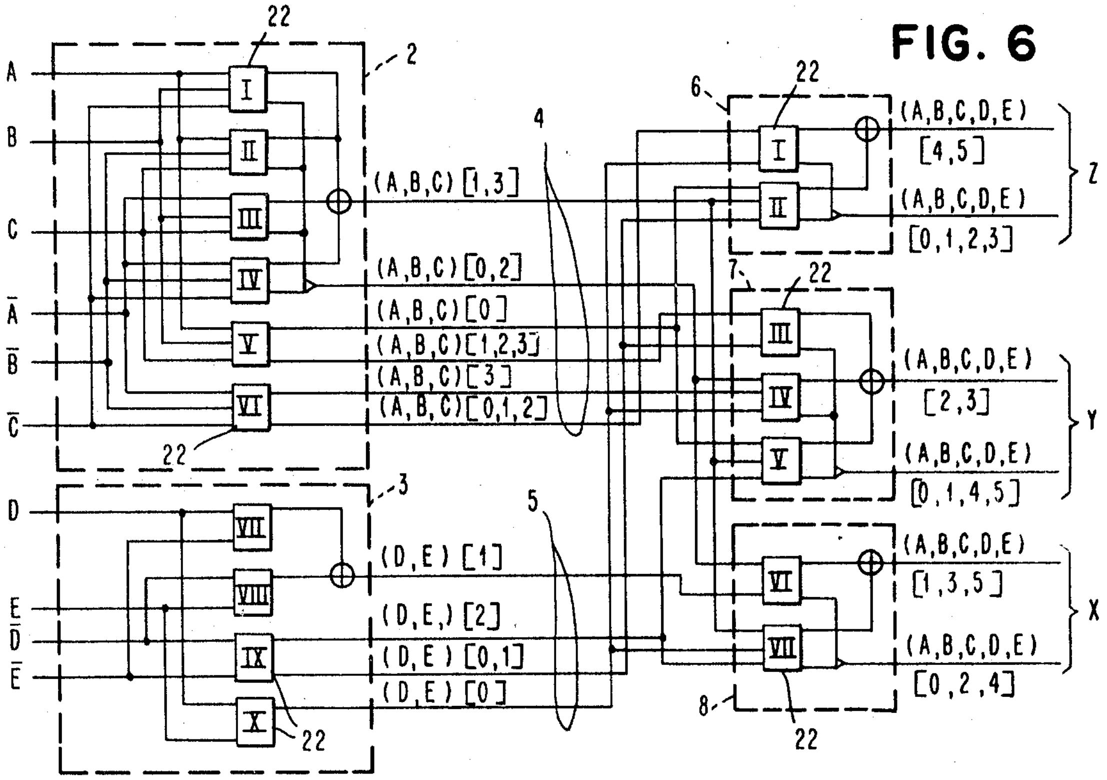
FIG. 6 depicts a 5–to–3 counter using the circuitry of FIG. 5 as represented by the symbology of FIG. 4.

In FIG. 6, a 5–to–3 counter in accordance with the present invention is depicted constructed of the current switches of FIG. 5 in accordance with the symbology of FIG. 4. In addition to the symbology of FIG. 4, the binary threshold function outputs from the threshold function generators 2 and 3 are defined to be a binary 1 when there are exactly *h*, or *i*, or *j*,...,or $\beta$ binary 1's among the inputs $I_1, I_2,...,I_n$ according to the notation $(I_1, I_2,...,I_n)$ $[h, i, j,...,\beta]$. For example, when a current switch of the FIG. 5 type has inputs A,B and C and the circuit is to operate such that an output threshold signal will be energized (that is, a binary 1) if exactly one of the three inputs or exactly three of the three inputs is a 1, the notation would be expressed as (A,B,C) [1, 3]. Similarly, if a circuit includes the inputs D,E,F and G and the threshold signal is to be a 1 if 2, or 3, or 4 of the inputs is a 1 then the notation would be (D,E,F,G) [2,3,4].

In counters which employ double-polarity signals, the notation calling for A,B, or C to be 1's necessarily implies that the other polarity signals, $\bar{A}$ $\bar{B}$ or $\bar{C}$, respectively, will be 0's and vice versa. Therefore, the expression $(\bar{A},\bar{B},\bar{C})$ [0,1,2] coming from a circuit which has inputs of $\bar{A}$,$\bar{B}$, and $\bar{C}$ implies that the output threshold signal will be a 1 if exactly 0, or 1, or 2 of those three inputs are a 0. In the example given with inputs $\bar{A}$,$\bar{B}$, and $\bar{C}$, if all three inputs are a 0, then the output will also be a 0.

Referring to FIG. 6, a 5–to–3 counter employing double-polarity signals is shown in detail. The five inputs A,B,C,D and E (including the other polarity levels $\bar{A}$,$\bar{B}$,...,$\bar{E}$) are divided into two groups including A,B,C $\bar{A}$, $\bar{B}$ and $\bar{C}$ in the first group and D,E, $\bar{D}$ and $\bar{E}$ in the second group. The first group of inputs is connected to the first threshold function generator 2 which consists of six current switches 22 designated by I,II,...,VI. Similarly, the second group of inputs is connected to the second threshold function generator 3 which includes four current switches 22 designated by $\underline{\text{VII}}$,...,$\underline{\text{X}}$.

The current switch 22 designated as I has as inputs A,B, and $\bar{C}$. Similarly, the current switch II includes inputs A,$\bar{B}$, and C. In a similar manner, each of the other current switches 22 has the indicated inputs as shown in FIG. 6. By emitter-dotting the NOR outputs from the current switches I,II,III, and IV, the binary threshold function (A,B,C,) [1,3] is formed as one of the six threshold functions in the first group 4 of threshold functions. In a similar manner, collector dotting the OR outputs of the current switches I,II,III and IV forms the threshold function (A,B,C) [0,2] which is a second one of the six threshold functions of the first group 4. It should be noted that the [A,B,C]0,2] function is the dual of the (A,B,C) [1,3] function and in general throughout the apparatus of the present invention, the emitter-dot of the NOR outputs is the exact dual of the collector-dot of the OR outputs. In a similar manner, the remaining four threshold functions consisting of (A,B,C)[0, (A,B,C) [1,2,3], (A,B,C) [3], and (A,B,C) [0,1,2] are formed.

Similar to the threshold functions 4 from the first threshold function generator 2 are the threshold functions 5 from the threshold generator 3. Those functions 5 include (D,E) [1], (D,E) [2], (D,E) [0,1], and (D,E) [0].

Having thus formed two groups of threshold functions using only one level of logic circuitry (that level formed by switches I,...,X̲ in generators 2 and 3) it is necessary to logically combine those threshold functions using only one more level of logic circuitry. In order to the weight 1 output designated X, two current switches 22, labeled VI and VII, form the first threshold combining circuit 8. Since the X output must be a 1 whenever 1, 3 or 5 inputs are a 1, the appropriate symbol for the X output signal is (A,B,C,D,E) [1,3,5] and the signal of the other polarity is therefore necessarily (A,B,C,D,E) [0,2,4]. Those signals are formed by combining, after current switch VI of the combining circuit 8, the NOR output of the threshold functions (D,E) [1] and (A,B,C) [0,2] in an emitter-dot OR with the NOR output of current switch VII, latter of which has as inputs (D,E) [2], (D,E) [0], and (A,B,C) [1,3 ], thereby forming the output (A,B,C,D,E) [1,3,5].

In a similar manner, the output (A,B,C,D,E) [0,2,4] is formed by collector-dotting the OR outputs of the current switches VI and VII in the first combining circuit 8.

In a manner similar to the first threshold combining circuit 8, the second threshold combining circuit 7, consisting of the current switches III IV and V, logically combines selected ones of the first and second threshold signals in the groups 4 and 5. The Z outputs are similarly formed.

The apparatus of FIG. 6 can be further explained by means of the following Boolean expressions for X,Y and Z. The Roman Numerals in the right-hand column correspond to the current switches in the combining circuits 6, 7 and 8 in FIG. 6. The right-hand terms of all the equations are readily derived from he left-hand terms on a line-for-line basis.

Figure 7:
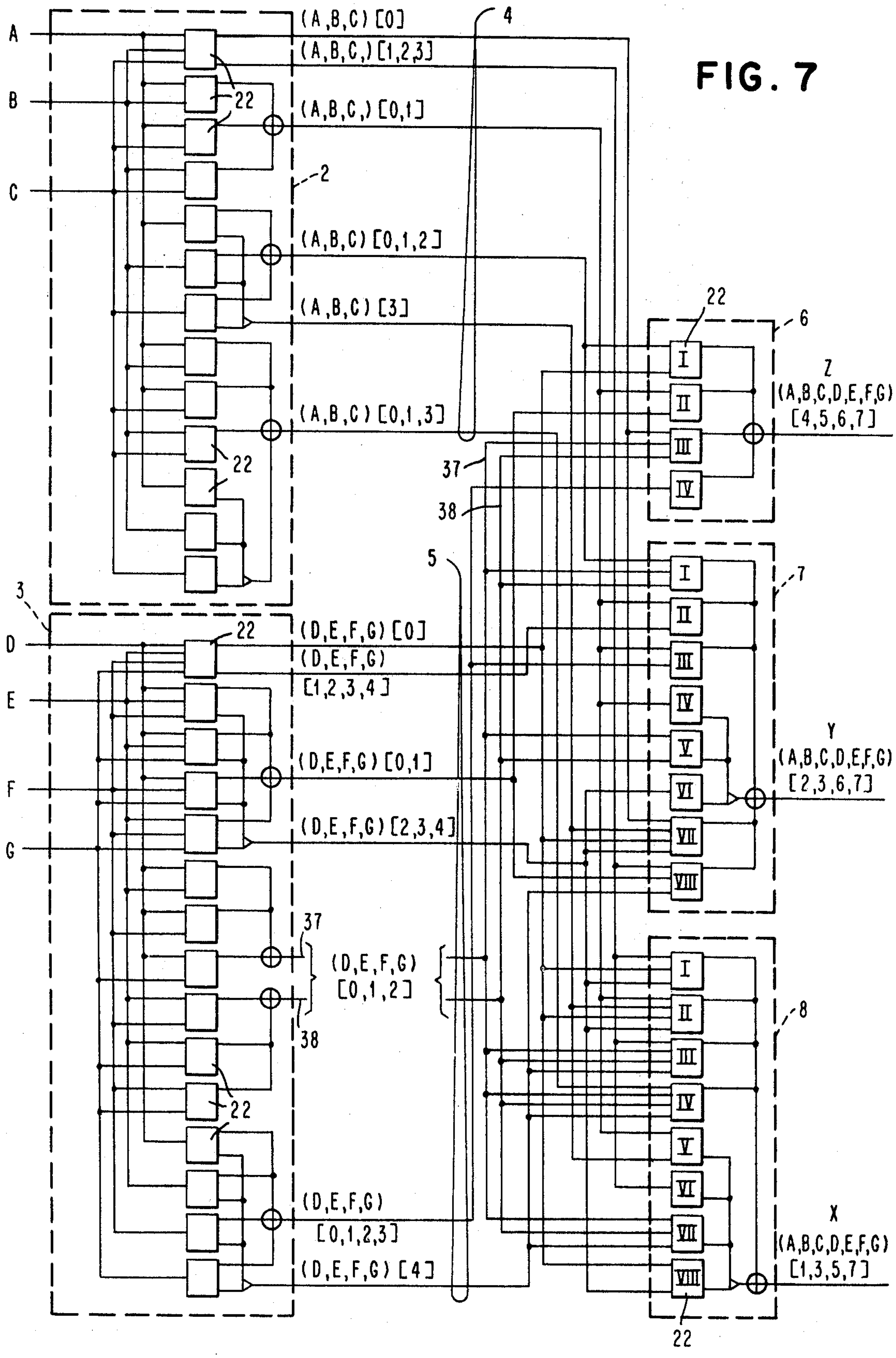
FIG. 7 depicts the 7–to–3 counter of FIG. 1 in detail.

In FIG. 7, a single-polarity 7–to–3 counter is depicted in detail. The FIG. 7 counter, like the FIG. 6 counter includes first and second threshold function generators 2 and 3, respectively, which form a first and second plurality of threshold functions 4 and 5, respectively. Those threshold functions are selectively combined in the first, second and third threshold combining circuits 8, 7 and 6, respectively. Since the symbology in FIG. 7 is the same as in FIG. 6, the many interconnections are clear from the FIG. 7 drawing and require no further description with one exception. That exception is the (D,E,F,G) [0,1,2] output from the generator 3. That output is designated as contained on two output lines 37 and 38 rather than on a single line. The reason that two lines are required is that connecting lines 37 and 38 directly together would violate the fan-in limitation of four "on" since there are three current switches connected to each line 37 and 38. The lines 37 and 38, however, when connected to current switches in the combining circuits 6, 7 and 8 are both always connected as inputs to the same current switch. In this manner, the limit of four emitter-dots being "on" at one time is not violated while effectively obtaining the OR of six lines.

The Z,Y and X outputs are readily obtained as shown by the following Boolean expressions. The current switches 22 in each of the combining circuits 6, 7 and 8 are assigned Roman Numerals which correspond with the following expressions on a line-for-line basis.

$$\begin{aligned}
Z &= (A,B,C,D,E)[4,5] \\
&= (A,B,C)[3]\cdot(D,E)[1,2] = \overline{(A,B,C)[0,1,2] + (D,E)[0]} && \text{I} \\
&\quad + (A,B,C)[2]\cdot(D,E)[2] \quad + \overline{(A,B,C)[0] + (A,B,C)[1,3] + (D,E)[0,1]} && \text{II}
\end{aligned}$$

$$\begin{aligned}
Y &= (A,B,C,D,E)[2,3] \\
&= (A,B,C)[0]\cdot(D,E)[2] = \overline{(A,B,C)[1,2,3] + (D,E)[0,1]} && \text{III} \\
&\quad + (A,B,C)[1]\cdot(D,E)[1,2] \quad + \overline{(A,B,C)[0,2] + (A,B,C)[3] + (D,E)[0]} && \text{IV} \\
&\quad + (A,B,C)[2]\cdot(D,E)[0,1] \quad + \overline{(A,B,C)[0] + (A,B,C)[1,3] + (D,E)[2]} && \text{V}
\end{aligned}$$

$$\begin{aligned}
X &= (A,B,C,D,E)[1,3,5] \\
&= (A,B,C)[1,3]\cdot(D,E)[0,2] = \overline{(A,B,C)[0,2] + (D,E)[1]} && \text{VI} \\
&\quad + (A,B,C)[0,2]\cdot(D,E)[1] \quad + \overline{(A,B,C)[1,3] + (D,E)[0,2]} && \text{VII}
\end{aligned}$$

$$\begin{aligned}
Z &= (A,B,C,D,E,F,G)[4,5,6,7] \\
&= (A,B,C)[3]\cdot(D,E,F,G)[1,2,3,4] = \overline{(A,B,C)[0,1,2] + (D,E,F,G)[0]} && \text{I} \\
&\quad + (A,B,C)[2,3](D,E,F,G)[2,3,4] \quad + \overline{(A,B,C)[0,1] + (D,E,F,G)[0,1]} && \text{II} \\
&\quad + (A,B,C)[1,2,3]\cdot(D,E,F,G)[3,4] \quad + \overline{(A,B,C)[0] + (D,E,F,G)[0,1,2]} && \text{III} \\
&\quad + (D,E,F,G)[4] \quad + \overline{(D,E,F,G)[0,1,2,3]} && \text{IV}
\end{aligned}$$

$$\begin{aligned}
Y &= (A,B,C,D,E,F,G)[2,3,6,7] \\
&= (A,B,C)[3]\cdot(D,E,F,G)[0,3,4] = (A,B,C)[3]\cdot(D,E,F,G)[3,4] \\
&\quad + (A,B,C)[2]\cdot(D,E,F,G)[0,1,4] \quad + (A,B,C)[2,3]\cdot(D,E,F,G)[0] \\
&\quad + (A,B,C)[1]\cdot(D,E,F,G)[1,2] \quad + (A,B,C)[2,3]\cdot(D,E,F,G)[4] \\
&\quad + (A,B,C)[0]\cdot(D,E,F,G)[2,3] \quad + (A,B,C)[0,1]\cdot(D,E,F,G)[2] \\
&\quad + (A,B,C)[1,2]\cdot(D,E,F,G)[1] \\
&\quad + (A,B,C)[0]\cdot(D,E,F,G)[2,3]
\end{aligned}$$

$$\begin{aligned}
&= \overline{(A,B,C)[0,1,2] + (D,E,F,G)[0,1,2]} && \text{I} \\
&\quad + \overline{(A,B,C)[0,1] + (D,E,F,G)[1,2,3,4]} && \text{II} \\
&\quad + \overline{(A,B,C)[0,1] + (D,E,F,G)[0,1,2,3]} && \text{III} \\
&\quad + ((A,B,C)[0,1])\cdot((D,E,F,G)[0,1,2])\cdot((D,E,F,G)[2,3,4]) && \text{IV, V, VII} \\
&\quad + \overline{(A,B,C)[0] + (A,B,C)[3] + (D,E,F,G)[0] + (D,E,F,G)[2,3,4]} && \text{VII} \\
&\quad + \overline{(A,B,C)[1,2,3] + (D,E,F,G)[0,1] + (D,E,F,G)[4]} && \text{VIII}
\end{aligned}$$

$$
\begin{aligned}
X &= (A,B,C,D,E,F,G)[1,3,5,7] \\
&= (A,B,C)[0,2]\cdot(D,E,F,G)[1,3] \\
&\quad + (A,B,C)[1,3]\cdot(D,E,F,G)[0,2,4] \\
&= (A,B,C)[0]\cdot(D,E,F,G)[1] \\
&\quad + (A,B,C)[2]\cdot(D,E,F,G)[1] \\
&\quad + (A,B,C)[0]\cdot(D,E,F,G)[3] \\
&\quad + (A,B,C)[2]\cdot(D,E,F,G)[3] \\
&\quad + (A,B,C)[1,3]\cdot(D,E,F,G)[0,2,4] \\
&= \overline{(A,B,C)[1,2,3]+(D,E,F,G)[0]+(D,E,F,G)[2,3,4]} && \text{I} \\
&\quad + \overline{(A,B,C)[0,1](A,B,C)[3]+(D,E,F,G)[0]+(D,E,F,G)[2,3,4]} && \text{II} \\
&\quad + \overline{(A,B,C)[1,2,3]+(D,E,F,G)[0,1,2]+(D,E,F,G)[4]} && \text{III} \\
&\quad + \overline{(A,B,C)[0,1,3]+(D,E,F,G)[0,1,2]+(D,E,F,G)[4]} && \text{IV} \\
&\quad + ((A,B,C)[0,1]+(A,B,C)[3]) && \text{V} \\
&\quad \cdot((A,B,C)[1,2,3]) && \text{VI} \\
&\quad \cdot((D,E,F,G)[0,1,2]+(D,E,F,G)[4]) && \text{VII} \\
&\quad \cdot((D,E,F,G)[0]+(D,E,F,G)[2,3,4]) && \text{VIII}
\end{aligned}
$$

Figure 8:
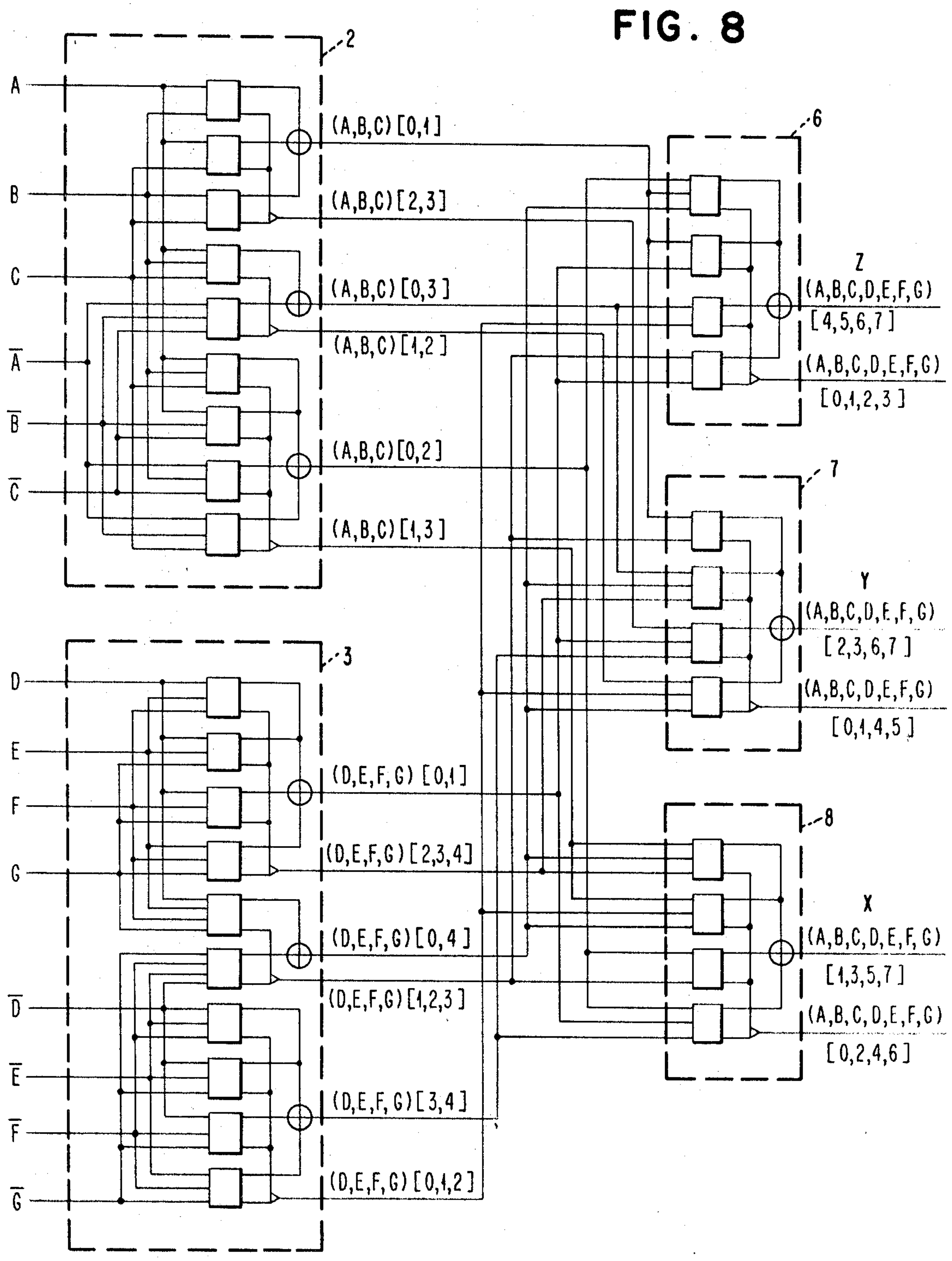
FIG. 8 depicts an alternate 7–to–3 counter which employs double polarity input and output signals.

FIG. 8 depicts a 7–to–3 counter implemented using double-polarity inputs and outputs. The counter has generators 2 and 3 for generating the binary threshold functions and combining circuits 6, 7 and 8 for combining those threshold functions. Boolean expressions similar to those previously given in connection with the description of FIGS. 6 and 7 can also be given for the FIG. 8 counter.

Figure 9:
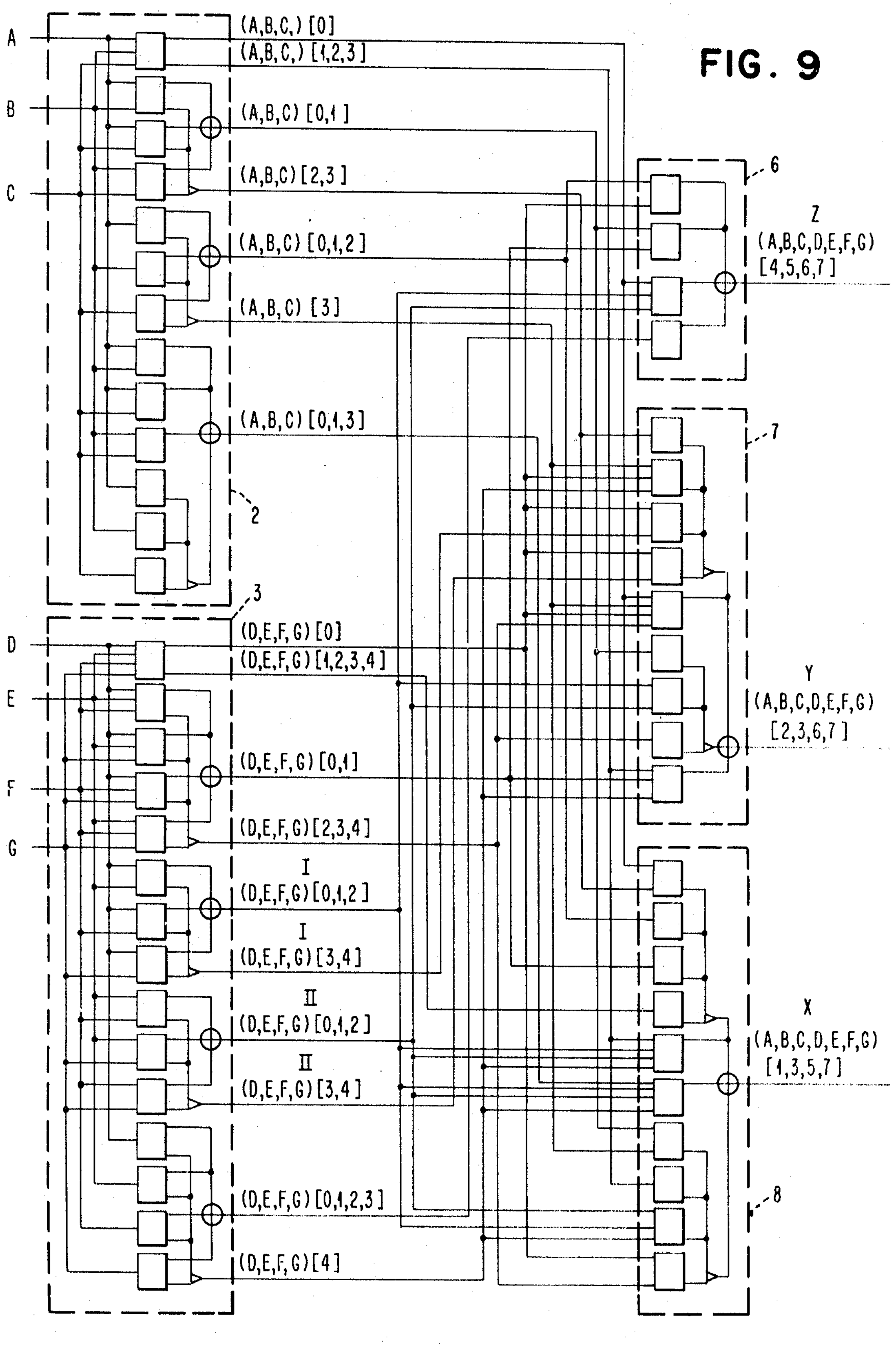
FIG. 9 depicts another alternate 7–to–3 counter.

FIG. 9 depicts a single-polarity 7–to–3 counter where the emitter-dot fan-in is limited to four or less. As previously discussed, the emitter-dot fan-in may be as great as eight provided that no greater than four of the inputs are energized at any one time. In the FIG. 7 implementation of a single-polarity 7–to–3 counter as many as six current switches were emitter-dotted although no more than four were "on" at one time. In FIG. 7 for example, the last connections before the X and Y outputs included five and six, respectively, emitter-dot connections. The FIG. 9 counter limits those emitter-dots to four thereby eliminating the need to determine if more than four will be "one."

OPERATION

Since the details of operation are apparent from the previous description, the description under this heading is presented in a summary fashion.

In FIG. 7, it is assumed that the counter inputs A,B,...,G are represented by 1100110, respectively. With those counter inputs, the threshold function (A,B,C) [0] is in a 0 condition because there is more than exactly zero 1's in the three inputs A,B, and C. In a similar manner, the binary threshold functions (A,B,C) [0,1], (A,B,C) [3], (A,B,C) [0,1,3] are also 0. Accordingly, the threshold functions (A,B,C) [1,2,3] and (A,B,C) [0,1,2] are a binary 1.

In the second plurality of inputs D,E,F and G again only two, E and F, are in the 1 condition. Therefore, the binary threshold functions in the 0 condition in the second group of functions are (D,E,F) [0], (D,E,F,G) [0,1], and (D,E,F,G) [4].

Having generated a first and second plurality of threshold functions, the first, second and third threshold combing circuits 8, 7 and 6 logically combine selected ones of the threshold functions from each of the first and second plurality of generated threshold functions 4 and 5. In the example given, there are exactly four 1's in the inputs so that the outputs X and Y are 0 and the output Z is a 1.

In another example with the counter inputs having 0110111 the counter outputs would be X a 1, Y a 0 and Z a 1. Similarly, counter inputs of 1001111 would yield counter outputs of X and Z 1's and Y a 0. Any other counter inputs for the FIG. 7 or other counters of the present invention would yield the appropriate counter outputs X, Y and Z.

Variations and Other Embodiments

While current switching logic (like the current switches 22 of FIG. 5) is desirable because of its high speed of operation other logic performing circuits may replace the current switches 22 so long as they are capable of performing the same or similar logical combinations of inputs.

The FIG. 6 counter demonstrates a typical double-polarity 5–to–3 counter in accordance with the present invention, but the present invention also encompasses counter inputs grouped in a different manner. More particularly, the first plurality of the counter inputs in FIG. 6 consists of the A,B,C (as well as the opposite polarity signals) and the second plurality of the counter inputs consists of the inputs D, and E (as well as the opposite polarity signals). In FIG. 6, therefore, a 3–2 grouping of inputs exists, that is, three in one group and two in the other. Other equivalent arrangements for 5–to–3 counters would include input groupings such as 4–1, 2–3, or 1–4.

While the invention has been described in connection with counters having three outputs, logic counters, such as a 15–to–4 counter, can be implemented employing the principles of the present invention. For example, a 15–to–4 counter can be implemented using as inputs three groups of five each. The three groups of inputs are analogous to the two groups of inputs described in connection with FIG. 1 and the other counters of this invention. The four outputs are similarly derived from four threshold combining circuits analogous to he circuits 6, 7 and 8 of FIG. 1. While 15 inputs are the maximum that can be counted by four counter outputs, 14–to–4, 13–to–4, etc. counters can be implemented in a manner analogous to that described for 6–to–3, 5–to–3, etc. counters. While two groups of inputs are preferred when 7–to–3 counters are desired and three groups for 15–to–4 counters, 4–to–3 counters can employ only one threshold function generator for a first group of inputs without any need for a function generator for the second group of inputs. Similar variations in input groupings may be employed for counters of any size.

While the counters of the present invention have all employed equally weighted inputs, unequally weighted inputs may be employed within the scope of the present invention. For example, a 7–to–3 counter having three equally weighted inputs of value 1 and two equally weighted inputs of value 2 can be counted using a counter having three outputs. With such a counter, the binary threshold functions formed are appropriately connected to compensate for the differently weighted inputs.

Another variation within the scope of the present invention includes threshold functions which are selectively generated. More particularly, a function (A,B,C) [0,1,3] normally includes an output when any combination of the inputs totals exactly 0, or exactly 1, or exactly 3. In the variation, however, threshold functions are generated in which only some combinations (but not all) total exactly 0, exactly 1, or exactly 3. For example, a typical threshold function such as (A,B,C) [0,1,3] can be in the 1 state when A and C are both 0 and B is 1 but be in the 0 state when A and B are both 0 and C is 1.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A counter for counting a plurality of binary inputs in terms of a fewer number of weighted binary outputs comprising:

first and second pluralities of counter input means, each of said inputs being connected to a counter input in only a predetermined one of said first or said second plurality of counter input means;

first threshold function generator means consisting of one level of logic circuitry which includes a first group of one or more logic performing circuits and which includes means connecting said first plurality of counter inputs to said first group whereby said first group logically combines said first plurality of counter inputs to form a first plurality of binary threshold functions;

second threshold function generator means consisting of one level of logic circuitry which includes a second group of one or more logic performing circuits and which includes means connecting said second plurality of counter inputs to said second group whereby said second group logically combines said second plurality of counter inputs to form a second plurality of binary threshold functions; and first, second and third threshold function combining means where each combining means consists of one level of logic circuitry, where each combining means is connected to receive selected different ones of said first and said second plurality of binary threshold functions and whereby said combining means logically combine threshold functions to form first, second and third weighted counter outputs, respectively.

2. The apparatus of claim 1 wherein said first group and said second group of logic performing circuits include a plurality of current switches for performing logical functions.

3. The apparatus of claim 1 wherein said first plurality of the counter inputs numbers three and wherein said second plurality of the counter inputs numbers four thereby forming a 7–to–3 counter.

4. The apparatus of claim 3 wherein said plurality of binary threshold functions consists of (A,B,C) [0], (A,B,C) [1,2,3], (A,B,C) [0,1], (A,B,C) [0,1,2,], (A,B,C) [3] and (A,B,C) [0,1,3]; and wherein said second plurality of binary threshold functions consists of (D,E,F,G) [0], (D,E,F,G) [1,2,3,4], (D,E,F,G) [0,1], (D,E,F,G) [2,3,4], (D,E,F,G) [0,1,2], (D,E,F,G) [0,1,2,3] and (D,E,F,G) [4].

5. A batch adder apparatus for simultaneously adding a plurality of numbers wherein each number includes a plurality of bit positions comprising:

a plurality of $n$ ordered counters, one for each bit position, wherein each counter is connected to receive a counter input from each number so as to count the inputs in terms of a fewer number of counter outputs and wherein each counter includes, first threshold function generator means consisting of one level of logic circuitry which includes a first group of one or more logic performing circuits and which includes means connecting a first plurality of the counter inputs to said first group hereby said first group logically combines said first plurality of the counter inputs to form a first plurality of binary threshold functions;

second threshold function generator means consisting of one level of logic circuitry which includes a second group of one or more logic performing circuits and which includes means connecting a second plurality of the counter inputs to said second group whereby said second group logically combines said second plurality of the counter inputs to form a second plurality of binary threshold functions;

first, second and third threshold function combining means where each combining means consists of one level of logic circuitry, where each combining means is connected to receive selected different ones of said first and said second plurality of binary threshold functions and whereby said combining means logically combine threshold functions to form a first, a second and a third counter output; and an adder including a plurality of $n$ ordered stages, one stage for each bit position and each stage corresponding to one of said counters, and including, for each $i^{th}$ counter, means connecting said first counter output to the $i^{th}$ adder stage, means connecting said second counter output to the $(i+1)^{th}$ order stage, and means connecting said third counter output to the $(i+2)^{th}$ order stage whereby said adder forms the final addition of said plurality of numbers.